L. E. SOWERS & P. S. PHILLIPS.
PROCESS OF SEPARATING MANGANESE DIOXID FROM ORE CONTAINING THE SAME.
APPLICATION FILED SEPT. 12, 1917.
1,277,144.
Patented Aug. 27, 1918.
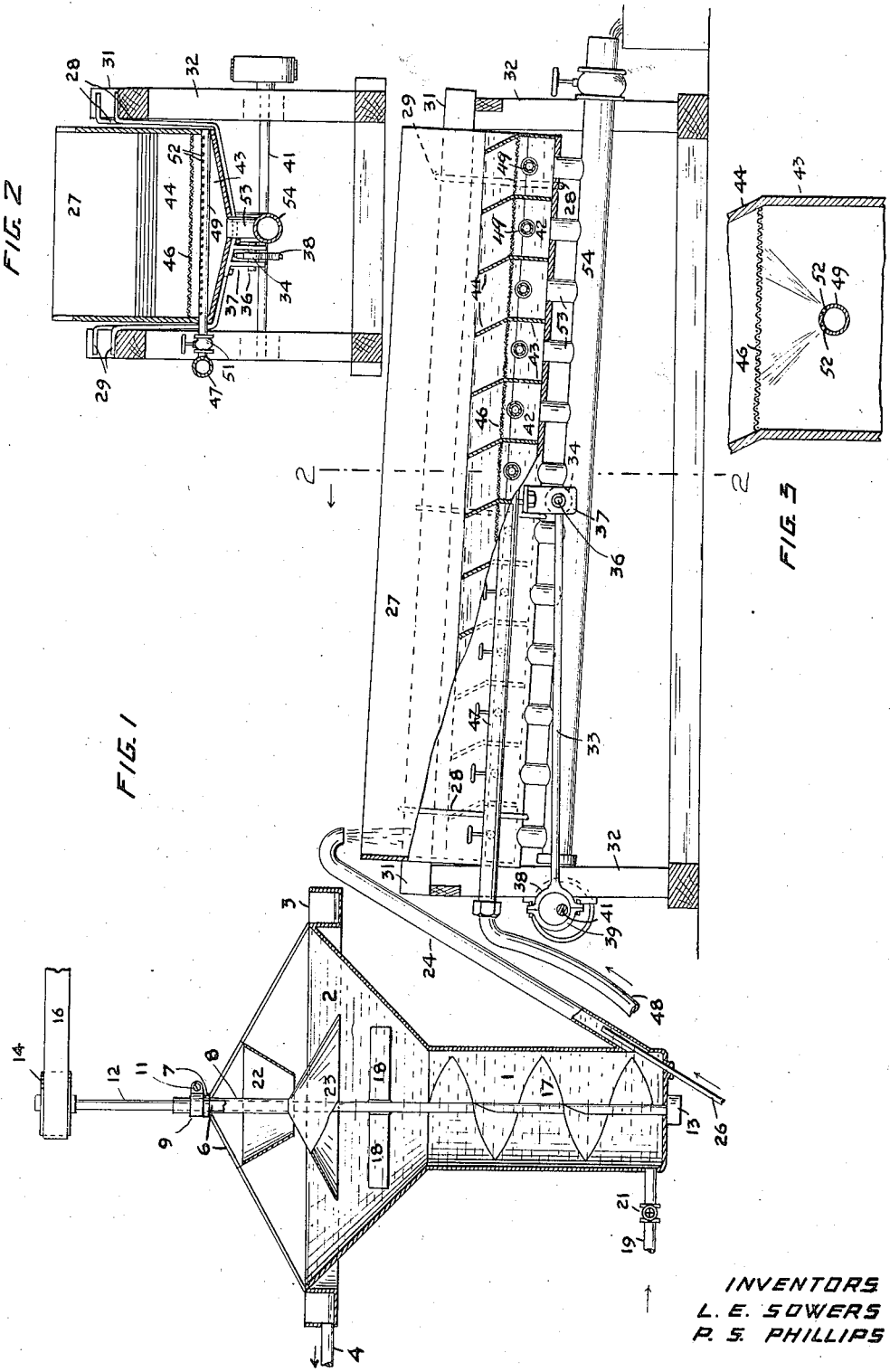
INVENTORS
L. E. SOWERS
P. S. PHILLIPS
BY *Fm. Wright.*
ATT'Y.

UNITED STATES PATENT OFFICE.

LEROY E. SOWERS AND PRESTON S. PHILLIPS, OF LIVERMORE, CALIFORNIA.

PROCESS OF SEPARATING MANGANESE DIOXID FROM ORE CONTAINING THE SAME.

1,277,144. Specification of Letters Patent. Patented Aug. 27, 1918.

Application filed September 12, 1917. Serial No. 191,078.

*To all whom it may concern:*

Be it known that we, LEROY E. SOWERS and PRESTON S. PHILLIPS, citizens of the United States, and residing in Livermore, in the county of Alameda, State of California, have invented new and useful Improvements in Processes of Separating Manganese Dioxid from Ore Containing the Same, of which the following is a specification.

The object of the present invention is to provide an improved process of separating dioxid of manganese from silica, and metallic manganese in ores or other mixtures containing the same.

In the accompanying drawing, Figure 1 is a vertical longitudinal section of our improved apparatus; Fig. 2 is a cross section on the line 2—2 of Fig. 1; Fig. 3 is an enlarged broken longitudinal section thereof.

Referring to the drawing, 1 indicates a vertically extending separating chamber having a flaring or conical upper portion or mouth 2. Surrounding said upper portion and attached to its edge, is a circular trough 3, from which leads a discharge conduit 4. Secured to the upper edge of said portion 2 are the lower ends of arms 6 which extend inwardly and are connected to a central circular bearing 7 through which extends a tubular hanger 8, having a collar 9 adjustable, as shown at 11, upon a vertical shaft 12 extending through said hanger and stepped at its lower end in a step bearing 13 in the bottom of the separating chamber. On the upper end of the shaft 12 is a pulley 14 which can be rotated by a belt 16 driven from any suitable source of power. Thereby rotation is imparted to the shaft 12 and also to an agitating screw 17 on said shaft in said separating chamber and to agitator arms 18 extending from said shaft in said upper portion 2.

Water is supplied to said separating chamber by an inlet pipe 19 controlled by a valve 21, and flows upwardly in said separating chamber. It is given a rotary motion by said agitating screw 17 and arms 18. Pulverized ore containing the manganese, dioxid of manganese and silica is fed into a hopper or chute 22 and drops upon the upper portion of a distributing cone 23 which is attached to the lower end of the tubular hanger 8, and the position of which, with reference to the hopper, can be adjusted by adjusting the position of the hanger. The specific gravity of some masses of dioxid of manganese, with included air, is less than 1, and therefore a rotary motion of the water in the upper chamber 2 has the effect of separating the manganese and silica, which being heavier than water, sink therein, while the dioxid of manganese floats on the surface of the water and is carried thereby to the outer edge of the conical upper portion 2 of the separating chamber, and is eventually floated from the same with the water which is continually flowing into the trough 3.

Although such masses of dioxid of manganese are considerably lighter than water, it has not been found possible heretofore to separate them from substances heavier than water, such as metallic manganese and silica, by ordinary methods which take advantage of the difference in the specific gravities of such materials, for the reason that, if the dioxid of manganese is not quickly separated it loses its included air and becomes completely saturated or soaked with water, and its specific gravity is then greater than that of water. In our improved process we rapidly separate the manganese dioxid before it has time to be thus saturated or soaked with water, and this we do by imparting a rotary motion to the water, which then quickly carries the light material outward by centrifugal force.

The manganese and silica sink to the bottom of the separating chamber and escape therefrom by an upwardly extending tube 24 leading from a side of the separating chamber near the bottom, and, the manganese and silicia being very heavy, their ascent in said tube 24 is facilitated by a jet of water under high pressure injected into said tube 24 through a narrow tube 26 entering the bottom of said tube 24. The water containing the metallic manganese and silica is thus discharged into the upper end of a separator, which consists of a box 27, slightly inclined downward at its forward end, and supported by means of straps 28 which extend around the bottom of said separator, and which have upper outwardly bent ends 29 resting upon longitudinal beams 31 supported on posts 32. Said box 27 is given a shaking motion in a longitudinal direction by means of a rod 33 having at its front end an eye 34 through which passes a pin 36 supported by hangers 37 depending from the bottom of the box, the rear end of said rod being connected to a ring 38 surrounding an eccentric 39 on a shaft 41 rotated by any suitable means.

The lower portion of the box is divided into compartments 42 by means of transverse partitions 43 which extend directly upward for a short distance from the bottom and then extend upwardly and rearwardly, as shown at 44. At the junctures of the portions 44 with the vertically extending portions of the partitions 43, there is supported a wire screen 46. A water pipe 47 extends along one side of the bottom of the box and is connected by a flexible hose 48 with a source of supply of water, and is also connected to branch pipes 49, one entering each compartment 42, and which are closed at the outer end and are controlled by valves 51. Each branch pipe is provided with two longitudinally extending series of upwardly directed small apertures 52, one series on each side of the central vertical plane through said branch pipe, through which apertures 52 jets of water are directed upwardly against the under side of the screen. These jets tend to continually drive upward the lighter particles of silica which eventually flow off with the water at the lower end of the box or trough 27 while having insufficient force to prevent the heavier particles of metallic manganese from falling through the wire screen which find their way by means of short vertical conduits 53, one for each compartment, into a central collecting pipe 54 along which the metallic manganese is washed down with the water and is conducted to a suitable receptacle from which it is recovered.

The bottom of the separator slopes downwardly on each side to the center in order to conduct to the short vertical conduits 53 the metallic manganese falling on the bottom of each compartment.

We claim:

The method of separating the constituents of ores which consists in feeding the ore in a dry condition to the central portion of the top of a body of water while causing said water to flow at a uniform speed from said central portion through a uniform distance to the periphery thereof whereby the lighter particles are carried from said periphery with said water while the heavier particles sink through the water.

LEROY E. SOWERS.
PRESTON S. PHILLIPS.